United States Patent

[11] 3,622,105

| [72] | Inventors | Hans-Dieter Buchholz<br>Oberuhldingen;<br>Hans-Peter Reerink, Meersburg, both of<br>Germany |
|---|---|---|
| [21] | Appl. No. | 820,430 |
| [22] | Filed | Apr. 30, 1969 |
| [45] | Patented | Nov. 23, 1971 |
| [73] | Assignee | Bodenseewerk Geratetechnik<br>Ueberlingen/Bodensee, Germany |
| [32] | Priority | Oct. 11, 1968 |
| [33] | | Germany |
| [31] | | P 18 02 518.8 |

[54] SPEED CONTROLLER FOR AIRCRAFT
4 Claims, 5 Drawing Figs.
[52] U.S. Cl. ................................................. 244/77 D,
244/77 M
[51] Int. Cl. ................................................. B64c 13/18
[50] Field of Search .......................................... 244/77, 77
A, 77 D, 42.1, 77 M, 77 S; 318/621

[56] References Cited
UNITED STATES PATENTS

| 2,948,496 | 8/1960 | Joline | 244/77 D |
| 3,327,972 | 6/1967 | Greene | 244/77 D |
| 3,448,948 | 6/1969 | Reerink | 244/77 D |
| 2,859,005 | 11/1958 | Owen et al. | 244/77 M |

*Primary Examiner*—Milton Buchler
*Assistant Examiner*—Jeffrey L. Forman
*Attorney*—Edward R. Hyde, Jr.

ABSTRACT: A speed controller for an aircraft is described, having a servo speed control loop and means for altering the response of the servo controller to an aircraft disturbance for a predetermined period of time upon initiation of the disturbance.

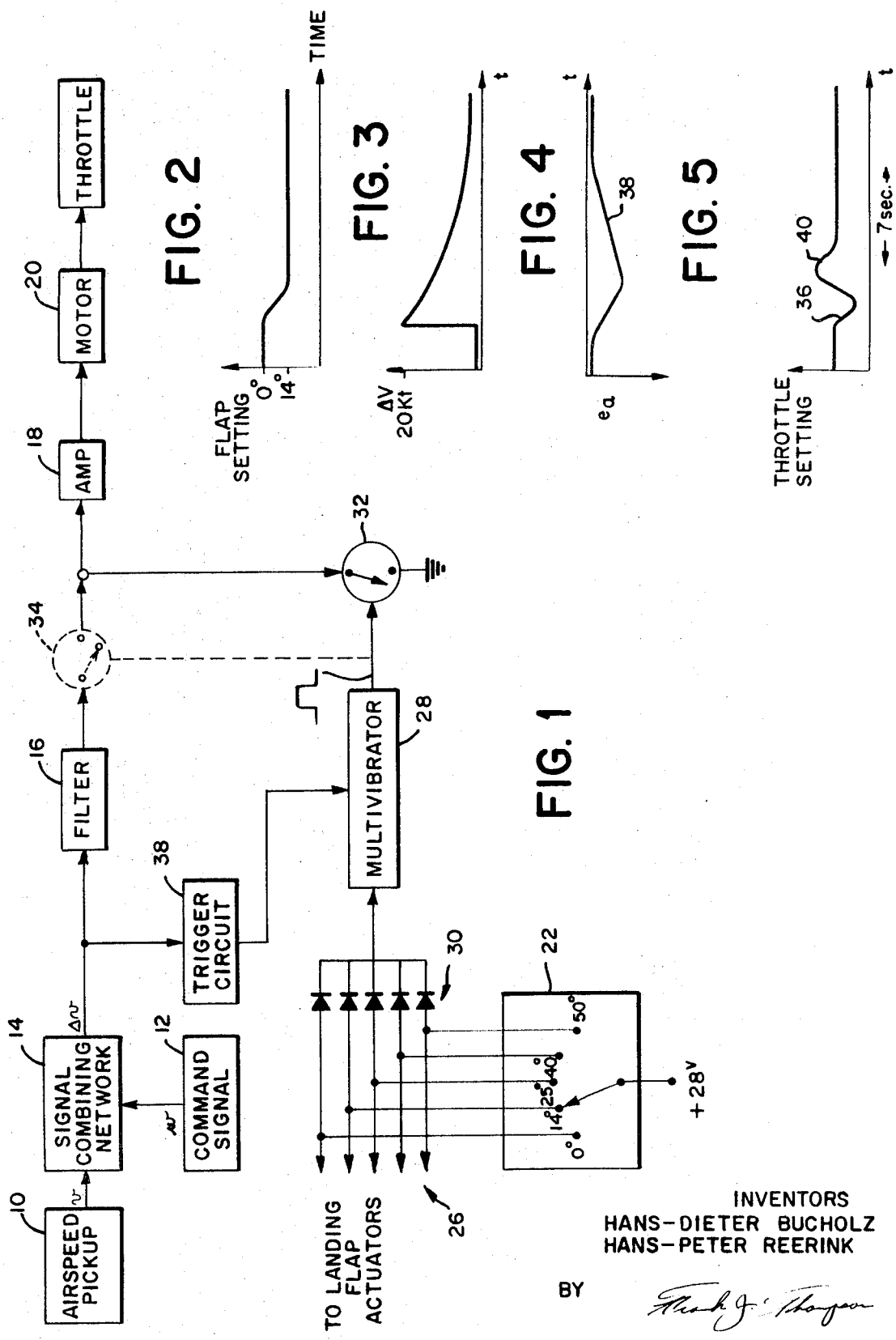

SPEED CONTROLLER FOR AIRCRAFT

This invention relates to a speed controller for aircraft. The invention relates more particularly to a speed controller of the type wherein a speed-regulating variable such as engine thrust is altered as a function of a speed-measured value such as velocity head or angle of attack for controlling the airspeed.

In a known aircraft speed controller, a closed servo loop is provided and includes an engine throttle control responsive to an input signal for altering engine thrust, a means providing a signal indicative of airspeed, a command signal and a control means for providing an output signal representative of airspeed deviations from the command speed. It is generally desirable to operate the aircraft with relatively small throttle movements in order to reduce an undesirable high engine thrust accompanied by large fuel consumption and engine noise at one moment and a large reduction in thrust at a subsequent moment. Large throttle movements result in increased fuel consumption as well as increased wear of the engines and is extremely unpleasant to the passengers. Passenger discomfort is particularly important in commercial passenger aircraft.

An arrangement operative during the occurrence of the disturbance for automatically compensating the disturbance is described and claimed in a copending U.S. Pat. application Ser. No. 822,650 filed on May 7, 1969 and which is assigned to the assignee of the present invention.

It is an object of this invention to provide an improved aircraft speed controller.

Another object of the invention is to provide an improved arrangement which is operative during a disturbance for automatically compensating for the disturbance.

Another object of the invention is to provide a speed controller for aircraft which operates with substantially uniform thrust and avoids the throttle movement occurring in prior art controllers.

A further object of the invention is to provide a speed controller for aircraft which substantially reduces large variations in throttle movement during a landing operation.

Still another object of the invention is to provide a speed controller for an aircraft which substantially avoids throttle variations upon extension of aircraft landing flaps and other such aerodynamic surfaces which create large variations in aerodynamic drag.

In accordance with a feature of the invention, means are provided for altering the response of the servo controller to a disturbance for a predetermined period of time upon initiation of disturbance. The speed controller is rendered nonresponsive to a transitory disturbance by increasing the thrust, although the final thrust will have substantially the same magnitude.

In a particular embodiment of the invention the controller response is automatically altered upon extension of the landing flaps. Upon extension of the landing flaps, the aerodynamic resistance of the aircraft is increased. At the same time the required airspeed, which is commanded as the set-point speed in the speed controller, is normally reduced. The thrust required before and after extension of the landing flaps does not differ greatly. The aircraft having an increased aerodynamic resistance is moved correspondingly more slowly. Nevertheless, in prior art speed controllers the process of extending the landing flaps has given rise to a considerable throttle movement. Although the set-point speed is decreased the inertia of the aircraft causes it to maintain its airspeed; an error signal $\Delta v$ is generated and the fuel supply to the engines is reduced to reduce engine thrust. When the decelerating effect of the extended landing flaps in conjunction with the reduction of the thrust become effective, the airspeed will usually be reduced below the newly commanded set-point speed, and the controller will react to increase the thrust. In the final state, the required thrust will become substantially equal to the previous value. Overshooting of the set-point speed will take place, particularly when a longitudinal acceleration signal is additionally applied to the speed controller to compensate for short time gusts. The deceleration resulting from the reduction of the set-point speed and simultaneous increase of the flow resistance accompanying extension of the flaps causes, subsequently, an increase in thrust over the desired value, which slowly reduces to the desired value.

This undesired effect is substantially reduced in accordance with the invention by altering the response of the controller in a manner for providing that the controller becomes inoperative during a limited period of time corresponding to the period of time when the thrust would overshoot. This period of time is referred to hereinafter as the "dead scanning interval." In one embodiment of the invention, this reduction is effected by interrupting the application of input signal to a component of the controller or automatically reducing the sensitivity of the controller. The thrust required upon extension of the landing flap is thereby reached and controlled without noticeable throttle movement for the extended position of the landing flaps.

In a particular embodiment of the invention, dead scanning of the controller is effected by providing means for decoupling the input of an amplifier energizing the servomotor upon initiation of a disturbance, A landing flap selector switch is coupled through diodes to a monostable multivibrator through which a mechanical or electronic switch is controlled for interrupting the amplifier input and thereby inhibiting an output from the controller.

It is possible that during the dead scanning interval, a certain limit of the speed deviation is exceeded with could result in a dangerous flight attitude while the controller remains inactive. This is particularly important during landing operations when it is essential that the airspeed be maintained above a certain minimum speed, at which minimum speed a stall is safely prevented. In accordance with another feature of the invention, means are provided for returning the monostable multivibrator circuit to a stable state when the deviation exceeds a predetermined limit value. In this case, the controller is made active prior to the end of the dead scanning period, in order to counteract the deviation.

These and other objects and features of the invention will be apparent with reference to the following specification and drawings, wherein:

FIG. 1 is a diagram partly in block form illustrating an embodiment of a speed controller constructed in accordance with features of the invention;

FIG. 2 is a diagram illustrating the extension of landing flaps over a period of time;

FIG. 3 is a diagram illustrating the speed deviation signal upon flap extension and speed deviation corresponding to adjustment of the controller set-point;

FIG. 4 is a diagram illustrating the acceleration of the aircraft upon flap extension as measured by a longitudinal accelerometer; and, FIG. 5 is a diagram illustrating the throttle acting as a function of time upon flap extension with a known servo controller.

Referring now to FIG. 1, an aircraft speed control servo loop is shown to include an airspeed pickup 10 which provides an electrical signal $v$ representative of airspeed, a source of command signal 12 for providing a signal representative of a command set-point speed and means 14 for providing an error signal $\Delta v$ representative of the difference between the signals $v$ and $\Delta v$. A throttle controller comprises a filter 16 and amplifier 18 which in response to the error signal $\Delta v$ drives a servomotor 20. The servomotor 20 is coupled to a throttle control for varying the fuel flow to the engines and therefore the engine thrust. Aircraft speed deviations from the command speed will be reflected as a variation in $v$ and an error signal $\Delta v$ thus generated will cause a variation in thrust for reestablishing the aircraft speed $v$ at the command speed $w$. A landing flap selection switch 22 is adapted to be switched with its movable contact arm 24 into five positions corresponding to the 0°, 14°, 25°, 40° and 50° landing flap positions. Each of the fixed contacts of the landing flap switch 22 are connected with an associated landing flap actuator, referred to generally as 26. The contacts are also coupled in parallel with the input of a monostable multivibrator circuit 28 through diode 30. The multivibrator 28 is adapted to provide an output pulse having a period of 7 seconds. The diodes 30 provide for a common input to the multivibrator while electrically isolating the fixed contacts. A switch 32 which comprises an electronic or mechanical switch, is controlled by the multivibrator 28 and is operative to alter the response of amplifier 18 by shorting its input terminals. Alternatively, as represented by the dashed lines, a switch 34 is opened by the multivibrator 28, and interrupts the input of amplifier 18.

The amplifier response is thereby altered by providing a low impedance input impedance or a series infinite impedance. Upon extension of the flaps by operation of the landing flap selector switch 22, the command speed set-point W is simultaneously changed in order to adapt the command speed set-point to the speed required upon flap extension. The increase in the flow resistance associated with flap extension and the simultaneous variation of the command speed set-point causes a considerable throttle movement to occur before the controller returns to a steady state. FIG. 2 illustrates how the landing flaps are extended from an angle of 0° to an angle of 14°. During flap extension, the command speed set-point is simultaneously altered. The aircraft initially maintains its original speed due to its inertia. A deviation $\Delta v$ occurs which reduces in accordance with the curve of FIG. 3. The deviation $\Delta v$, which indicates that the actual airspeed is too large compared with the set-point, normally effects a reduction of the fuel supply to the engines as shown by curve segment 36 in FIG. 5. By the extension of the landing flaps and the reduction of the thrust, the aircraft decelerates as shown by the curve 38 of FIG. 4, which illustrates acceleration as a function of time. Normally, there will be an overshooting of the throttle position in the opposite direction as shown by curve segment 40 in FIG. 5. This is applicable particularly in those cases where an acceleration signal from a longitudinal accelerometer, not shown, is applied to the speed controller in addition to the deviation signal $\Delta v$. As the deviation signal $\Delta v$ decreases, the acceleration signal which indicates a deceleration may exceed the deviation signal and the controller will then demand an increase in thrust. This results in overshooting 40 of the throttle position in accordance with FIG. 5. Subsequently, as shown in FIG. 5, that throttle position substantially approaches the initial position existing prior to the flap extension at a correspondingly higher airspeed.

An undesired throttle movement represented by the curve segments 36 and 40 in FIG. 5 is avoided in accordance with a feature of the invention as the speed controller is dead scanned upon flap setting for a predetermined time such as 7 seconds, or is switched to another mode of operation in which the controller does not react to disturbances. This is effected when the switch 22 is operated since the monostable multivibrator 28 is triggered through diodes 30. This occurs upon each individual switching step and switch 32 is thereby actuated and connects the input of amplifier 18 to ground. Thus motor 20 is stopped and the throttle is maintained at its last position. After a time interval of about 7 seconds, a steady state flight has been reached. When now the switch 32 is opened, the throttles move smoothly into their new position, if such a new position should be necessary.

When during a dead scan interval of the monostable multivibrator 18 a critical limit value of the deviation $\Delta v$ is exceeded, a trigger multivibrator 38 is triggered for returning the monostable multivibrator to its stable state prior to the end of the normal dead scan interval, and thereby switches the controller on. The controller then counteracts a critical speed deviation by operating on the throttles.

Although the invention has been described with respect to the adjustment of the throttles, the controller can operate on any appropriate speed regulating variable, such as control surfaces of the aircraft. In addition to the extension of the landing flaps, the features of the invention can advantageously be employed to compensate other disturbances initiated by the pilot, such as a short time actuation of the spoilers.

An aircraft speed controller has thus been described which advantageously alters the response of the servo controller during a disturbance and thereby reduces repeated throttle activity.

While I have illustrated and described a particular embodiment of my invention, it will be understood that various modifications may be made therein without departing from the spirit of the invention and the scope of the appended claims.

What is claimed is:

1. In a speed controller for an aircraft having a servo speed control loop and including a controller means for providing speed regulation in accordance with variations in airspeed from a command speed, the improvement comprising means for causing the servo controller to become unresponsive to an aircraft disturbance during the occurrence of an aircraft disturbance for a predetermined period of time upon initiation of the disturbance, means for simultaneously causing an extension of an aircraft control surface and an alteration of the response of the servo controller, said last named means comprising a switching means having a plurality of contacts each of which is coupled to an associated prime mover for establishing a predetermined extension of a landing flap, a plurality of unidirectional electrical elements each coupled to an associated contact of said switching means and having a common output junction coupled to a monostable multivibrator for triggering said vibrator to provide an output pulse therefrom when a prime mover energizing potential is applied to a one of said contacts, and switching means coupled between said multivibrator and said controller and operative in response to said multivibrator pulse for altering the response of said controller.

2. The aircraft controller of claim 1 wherein means are provided for automatically returning said multivibrator to its stable state prior to a termination of said output pulse when an error signal $\Delta v$ of the servo controller exceeds a predetermined value.

3. The speed controller of claim 1 wherein said switching means for altering the response of said controller is arranged for short circuiting an input of a component of said controller.

4. The speed controller of claim 1 wherein said switching means for altering the response of said controller is adapted for interrupting a coupling between components of said controller.

* * * * *